United States Patent

[11] 3,605,095

[72] Inventor Robert A. Higgins
Apt. 34 Hawerysh Apts., Brookings, S. Dak.
[21] Appl. No. 862,742
[22] Filed Oct. 1, 1969
[45] Patented Sept. 14, 1971

[54] DEVICE FOR MEASURING RELATIVE VELOCITIES
8 Claims, 2 Drawing Figs.
[52] U.S. Cl. ................................................. 343/112 S
[51] Int. Cl. ................................................. G01s 9/44
[50] Field of Search .......................................... 343/8, 112 S

[56] References Cited
UNITED STATES PATENTS
2,770,795 11/1956 Peterson..................... 340/3

Primary Examiner—Rodney B. Bennett, Jr.
Assistant Examiner—R. Kinberg
Attorney—Lucas J. De Koster ABSTRACT: An electronic device for determining the relative speed between two units—vehicles or the like—by utilizing the Doppler effect. A transmitter would be located in one vehicle to transmit on a given frequency but also to transmit an encoded number corresponding to the transmitting frequency. The receiver, by detection of the shift between the coded number and the received frequency would determine the relative speed between the transmitter and the receiver.

Robert A. Higgins
INVENTOR

BY Lucas J. N Foster
His Att'y.

DEVICE FOR MEASURING RELATIVE VELOCITIES

BACKGROUND AND SUMMARY OF THE INVENTION

This invention pertains to speed detection units and more particularly to a device for indicating the relative speed between two units by using the Doppler effect. The possibility of momentary errors because of instability in the system is averted.

Many devices have been proposed, and some used to determine the speed of a vehicle. Some of these may be appropriate also to determine the speed of approach of one vehicle relative to another. The usual system is a radar-type system in which the difference in frequency between that reflected from the moving object and that reflected from a fixed object or between the reflection from the moving object and the transmitted signal was sensed and converted into a velocity figure which could be read out and understood in standard velocity measurement.

These systems have various shortcomings. Momentary instability can cause variations between the frequency transmitted at the time the reflected wave was sent out and the frequency at the time of reception. Radar is nonselective, and either a highly directional antenna must be used, or there must be some other means of identifying the object from which the signal is reflected. Without that, there is no possibility of knowing what speed is being measured.

My device eliminates even momentary errors and since normally the receiver will be carried by one unit and the transmitter by another, the identification is unnecessary except as between the various units and not between all possible objects. To that extent, my device may have utilization in collision avoidance systems as well as simply velocity measurement.

FIGURES

Figure 1:
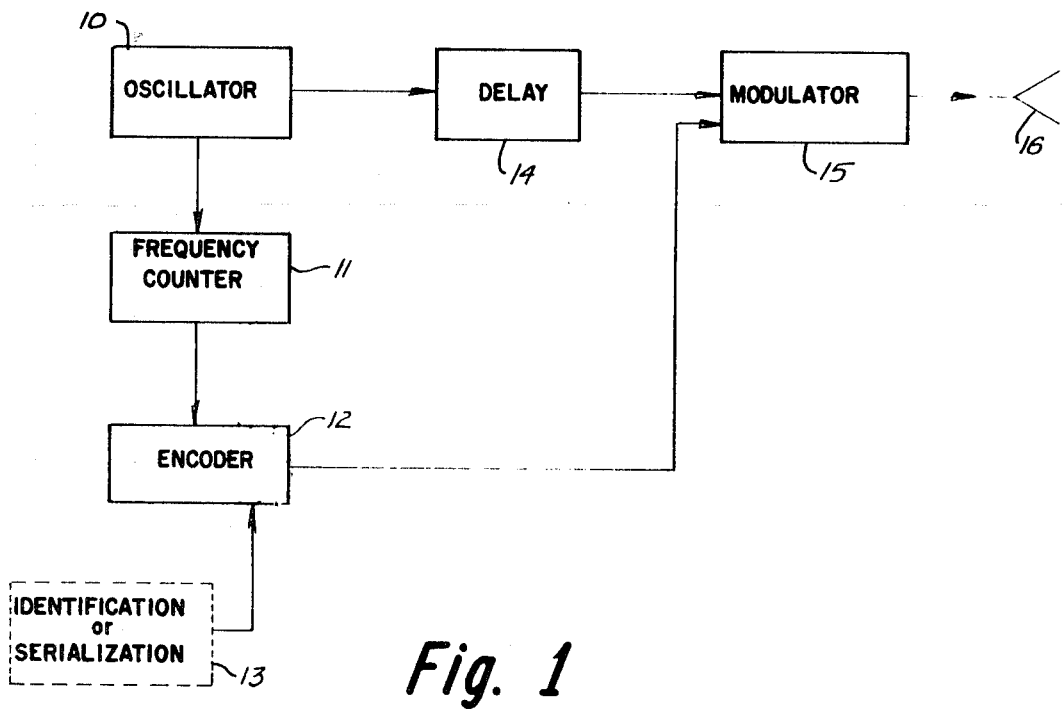
Figure 2:
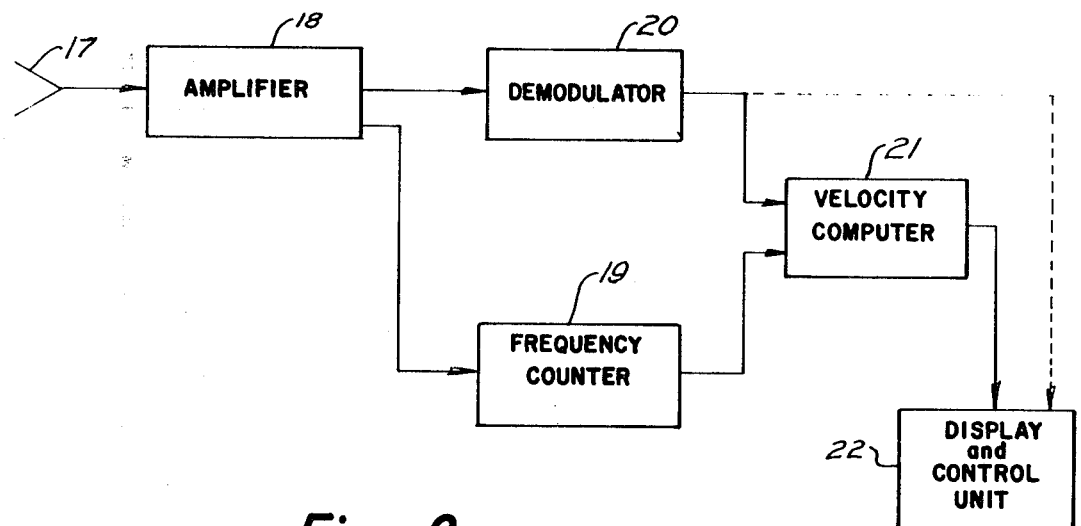

FIG. 1 is a diagrammatic sketch of the functional units utilized in the transmitter, and FIG. 2 is a similar diagram of the units in the receiver.

DESCRIPTION

Briefly my invention comprises a device by which velocity may be determined by means of transmitting means in one vehicle adapted to transmit an encoded signal including both the identification of the vehicle and the instantaneous frequency at which the signal is being transmitted, and receiving means either in another vehicle or in a stationary location which can compare the actual received frequency with the encoded transmitted frequency to indicate velocity and also distinguish the identity signal.

More specifically and referring to the drawings I provide for transmitting unit to be carried by the vehicle. This unit is shown diagrammatically in FIG. 1 and includes an oscillator 10 which generates a carrier wave. In the present state of the art this would almost undoubtedly be an electromagnetic wave in the range of radio frequencies. However, I envision the possibility of using a beam in the range of visible light frequencies or perhaps a compressive wave similar to sound waves.

The carrier signal is then divided with one part being sent through a frequency determining unit 11. This unit determines the actual frequency generated and feeds that information to an encoding unit 12. It will be apparent to those skilled in the art that any of the several devices now known and which are able to determine frequency may be used and that throughout this application the terms "counter" or "frequency counter" may apply to any such device. The encoder 12 may also receive information from an identification unit 13. The identifier is not necessary, but can provide useful information concerning the identity of the vehicle carrying the transmitter.

The encoder 12 translates the information received from the counter 11 and the identifier 13 into suitable analog or digital form, and imposes this information on the carrier wave by suitable type of modulation.

The second part of the generated signal is sent through a delay device 14. The delay here is of the same length as the time required for the first portion of the signal to pick up the encoded information from the encoder 12 through the counter 11 and from the identifier 13. Thus, the two branches of the original signal are again united in the modulator 15. Such use of the delay unit 14 makes certain that instantaneous shifts in frequency from the oscillator 10 or instability in the oscillator do not affect the accuracy of the device. Since the wave which is counted is a portion of exactly the same wave as transmitted, the encoded number will still be the correct frequency as actually transmitted, and the apparent shift between the encoded number and received frequency will provide an accurate measure.

The transmitting antenna 16 or transducer may be properly chosen for the type of wave used by the device. Such choice is well within the ability of anyone skilled in the art.

The receiving device is shown diagrammatically in FIG. 2. This device is adapted to receive the signal at a receiving antenna 17 or transducer and feed it into the amplifier 18. At this point, the received signal is again divided with one branch going through a counter 19 where the frequency of the received signal is determined.

The other branch of the signal is fed into a demodulator 20 or detector which distinguishes the coded information and also separates the coded frequency number from the identification signal. The frequency number is fed into a velocity computer 21. This computer also receives the information from the counter 19 again with proper time phasing so that the counted signal is a part of the identical signal carrying the encoded frequency number. The computer 21 by comparing the counted signal with the encoded frequency number determines the relative velocity between the sending unit and the receiving unit in the same manner as a radar unit might.

The display unit 22 receives the information from the computer 21 as to speed and from the demodulator 20 as to identity and provides for display of the information. This display would ordinarily be a visual display on a dial or the like, but could well be audible or even tactile if desired. For example, if the sending unit were a stationary unit along a highway and the receiver were required to be in any automobile using that highway, the device could be built to induce a mild electric shock through the seat of the car to any driver who exceeded a certain speed, or it could sound an audible alarm for excess speed.

It is obvious that my device can be used to determine the relative speed between a stationary object such as a receiver unit mounted alongside a highway and a moving vehicle carrying a transmitter. It could also be used to determine relative speeds between a moving police car and another moving car. In this latter case, the speed of the police car could also be fed into the computer 21 to determine the actual speed of the automobile on the highway as well as the relative speeds. In either of these events, the installation of the transmitter in the one automobile would be essential. This equipment might be required by law on all roads, or perhaps only on certain limited use highways.

However, I see alternate possibilities of utility for this system. For example, in aircraft or spacecraft the device combined with a direction indicating device could be used for collision avoidance systems. The same utility is available to maritime vessels.

Thus, either separately or in combination with other systems, I have provided a very useful and novel device.

I claim:

1. A device for measuring relative speed between two units comprising:
   a. Oscillator means to generate a carrier wave,
   b. Means connected to said oscillator means to receive impulses of said wave and measure and encode the frequency thereof and to impose such encoded frequency on said wave and to transmit it, and
   c. Receiver means to receive said wave including means to distinguish said encoded frequency, means to measure the received frequency, both of said last-named means being connected to computer means, said computer means being adapted to compare the encoded frequency with the received frequency to compute the relative velocity therefrom.

2. The device of claim 1 in which said means connected to said oscillator means includes dual branches, one branch including frequency measuring and encoding means and the other branch including delay means whereby the encoded frequency is imposed on waves generated simultaneously.

3. The device of claim 2 in which identification means is also connected to the encoding means whereby coded identification is also imposed on said wave.

4. The device of claim 1 in which said receiver includes display means whereby said velocity is displayed to an operator.

5. The device of claim 3 in which said receiver includes a display means whereby said velocity and identification is made evident to an operator.

6. The method of measuring relative velocity between a wave source and a receiver which comprises generating a carrier wave, imposing the counted frequency of said wave as encoded intelligence on said wave and comparing the encoded intelligence with the counted frequency of the wave as received by said receiver.

7. The method claimed in claim 6 in which said counted frequency is imposed on the wave generated simultaneously with the wave whose frequency is counted.

8. The method of claim 6 in which identification information is also imposed on said wave and discriminated by said receiver.